Sept. 30, 1969     N. E. ANDERSSON ET AL     3,470,405
ROTATING RECTIFIER DEVICE
Filed Oct. 30, 1967                          2 Sheets-Sheet 1

INVENTOR.
NILS ERIC ANDERSSON
BY GÖRAN LILJA

Sept. 30, 1969    N. E. ANDERSSON ET AL    3,470,405
ROTATING RECTIFIER DEVICE
Filed Oct. 30, 1967    2 Sheets-Sheet 2

INVENTOR
NILS ERIC ANDERSSON
GÖRAN LILJA
BY *Jennings Bailey, Jr.*
ATTORNEY

United States Patent Office 3,470,405
Patented Sept. 30, 1969

3,470,405
ROTATING RECTIFIER DEVICE
Nils Eric Andersson and Goran Lilja, Ludvika, Sweden, assignors to Allmänna Svenska Elektriska Aktiebolaget, Vasteras, Sweden, a Swedish corporation
Filed Oct. 30, 1967, Ser. No. 679,076
Claims priority, application Sweden, Nov. 2, 1966, 15,006/66
Int. Cl. H02k 11/00
U.S. Cl. 310—68     7 Claims

ABSTRACT OF THE DISCLOSURE

A rotating rectifier device for magnetizing a synchronous machine is fed by a feeding generator driven by said machine. It includes a rectifier bridge for each phase of the rotor winding of the feeding generator. Each rectifier bridge is supported by the shaft of the feeding generator and comprises an outer ring, an inner ring formed of two halves insulated from each other and a plurality of rectifiers arranged between the rings.

BACKGROUND OF THE INVENTION

Field of the invention

The invention relates to a rotating rectifier device for magnetizing a synchronous machine fed by a feeding generator driven by such machine.

The prior art

To generate a magnetising current for the rotor winding of synchronous machines a direct current generator is usually used on the shaft of the synchronous machine and direct current withdrawn from the brushes of the direct current machine is transmitted to the magnet winding over brushes and slip rings.

Such a means, however, has the considerable disadvantage that commutator, brushes and slip rings become extremely worn. This means that the machine must be stopped at certain intervals for inspection and replacement of especially the brushes. In order to avoid this, rectifiers have been arranged on the rotor shaft of the feeding machine, which are fed with three-phase alternating current from the rotor winding and their emitted direct current is supplied to the rotor winding of the synchronous machine.

SUMMARY OF THE INVENTION

The present invention relates to a rectifier device of the type mentioned for magnetising synchronous machines and fed by a feeding generator driven by a synchronous machine, in which said device consists of a rectifier bridge for each phase of the rotor winding of the feeding generator. The invention is characterised in that such a rectifier bridge comprises an outer ring, an inner ring consisting of two ring halves insulated from each other and surrounding the shaft of the feeding generator, and a number of rectifiers arranged between the two rings.

BRIEF DESCRIPTION OF THE DRAWINGS

In the accompanying drawings

DESCRIPTION OF THE PREFERRED EMBODIMENTS

Figure 1:
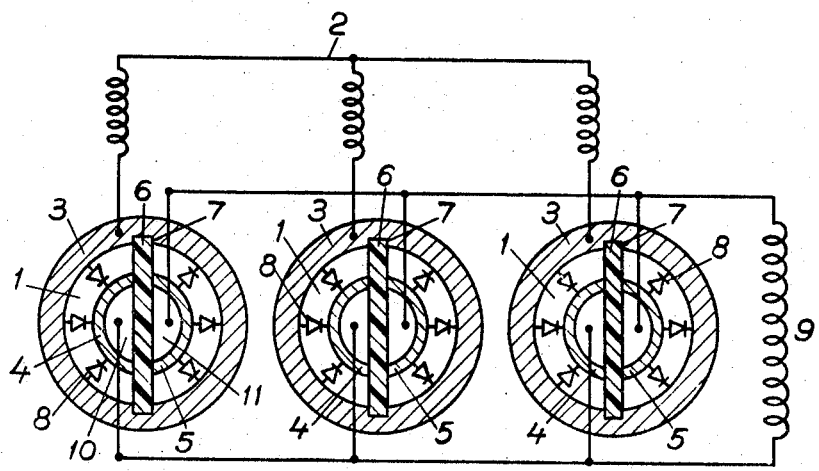
FIGURE 1 shows a connection diagram for the rectifier device.

The rectifier device according ot the invention consists of three similar rectifier bridges 1, one for each phase of the rotor winding 2 of the feeding generator. The rotor winding is, for example, Y-connected and the free end of each of the phase windings is connected to the outer ring 3 of the corresponding rectifier bridge. Each bridge also comprises an inner ring consisting of two ring halves 4 and 5 insulated from each other by a sheet 6 of insulating material. The sheet is attached in a groove 7 in the outer ring 3. Between the outer ring 3 and the inner ring consisting of the ring halves 4 and 5 is a number of rectifiers 8. The rectifiers may be diodes or thyristors or some other type of rectifier. As seen from FIGURE 1 the rectifiers are turned so that the ring half 4 is positive and the ring half 5 negative when the alternating voltage from the rotor winding 2 is applied to the rectifier device. The direct current obtained is supplied to the rotor winding 9 of the synchronous machine. The rectifier bridges are supported by the shaft of the feeding machine which is split by a diametric cut into which the insulating sheet 6 is inserted. The two shaft halves 10 and 11 are thus electrically insulated from each other.

Figure 2:
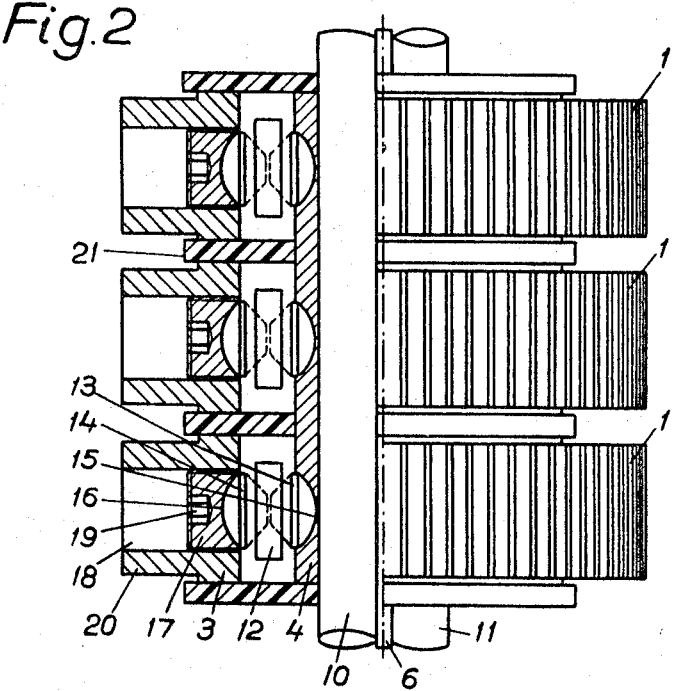
FIGURE 2 shows, partly in section, a side view of the device
Figure 3:
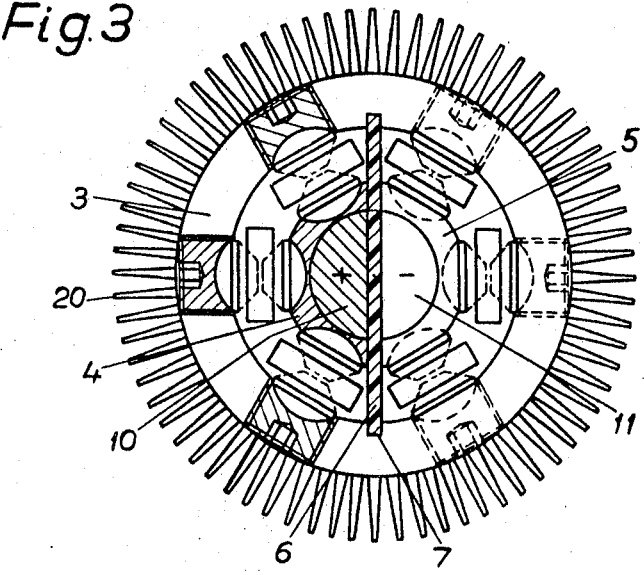
FIGURE 3 shows a diametric section through a rectifier bridge in the device.

With reference to FIGURES 2 and 3, a diode 12 is inserted between an inner current collector 13 and an outer current collector 14. The inner current collector is situated in a notch 15 in the inner ring. The outer current collector is situated in a notch 16 in a tension screw 17 screwed into the outer ring 3. The tension screw is screwed into a threaded, through-going hole 18 in the outer ring. The tension screw 17 is provided with a hexagonal hole 19 for a spanner.

The tension screw is intended to keep the diode in position with sufficient pressure against the two current collectors, and to conduct away the heat generated in the diode 12 to the outer ring and thus maintain the diode at a sufficiently low temperature. The surfaces of the current collectors turned away from the diode are suitably spherical and will therefore adjust the pressure surfaces against the diodes so that good contact is obtained over the entire pressure surface. Cooling flanges 20 are provided all round the outer ring to supply good cooling.

FIGURE 2 shows that the three rectifier bridges are arranged one after the other on the shaft and separated by discs 21 of insulating material.

The invention is not limited to the use of diodes. Of course other rectifier elements may be used, for example controlled thyristors, in which case control pulses to these may be transmitted electromagnetically or optically without direct connection with the rotating device.

We claim:

1. Rotating rectifier device for magnetizing synchronous machines and fed by a feeding generator driven by said synchronous machine, in which said device comprises a rectifier bridge for each phase of the rotor winding of the feeding generator, characterized in that each rectifier bridge (1) comprises an outer ring (3), an inner ring comprising two ring halves (4, 5) insulated from each other and surrounding the shaft of the feeding generator, and a plurality of rectifiers (8) arranged between the two rings.

2. Rectifier device according to claim 1, characterized in that the outer ring is connected to one phase of the rotor winding of the feeding generator.

3. Rectifier device according to claim 1, characterized in that one ring half (4) comprises the plus pole of the device and the other (5) its minus pole.

4. Rectifier device according to claim 1, characterized in that the outer ring is provided with cooling flanges (20).

5. Rectifier device according to claim 1, characterized in that the rectifiers are diodes.

6. Rectifier device according to claim 1, characterized in that the rectifiers are thyristors.

7. Rectifier device according to claim 1, characterized in that the rectifiers (12) are inserted between an inner current collector (13) leading into the inner ring (4, 5) and an outer current collector (14) inserted in a tension screw (17) screwed into the outer ring (3).

References Cited
UNITED STATES PATENTS

| | | | |
|---|---|---|---|
| 3,412,271 | 11/1968 | Hall | 310—68 |
| 3,368,091 | 2/1968 | Layman | 310—68 |
| 3,205,421 | 9/1965 | Webb | 310—68 X |
| 3,160,771 | 12/1964 | Martin et al. | 310—68 |

WARREN E. RAY, Primary Examiner

MARK O. BUDD, Assistant Examiner